UNITED STATES PATENT OFFICE.

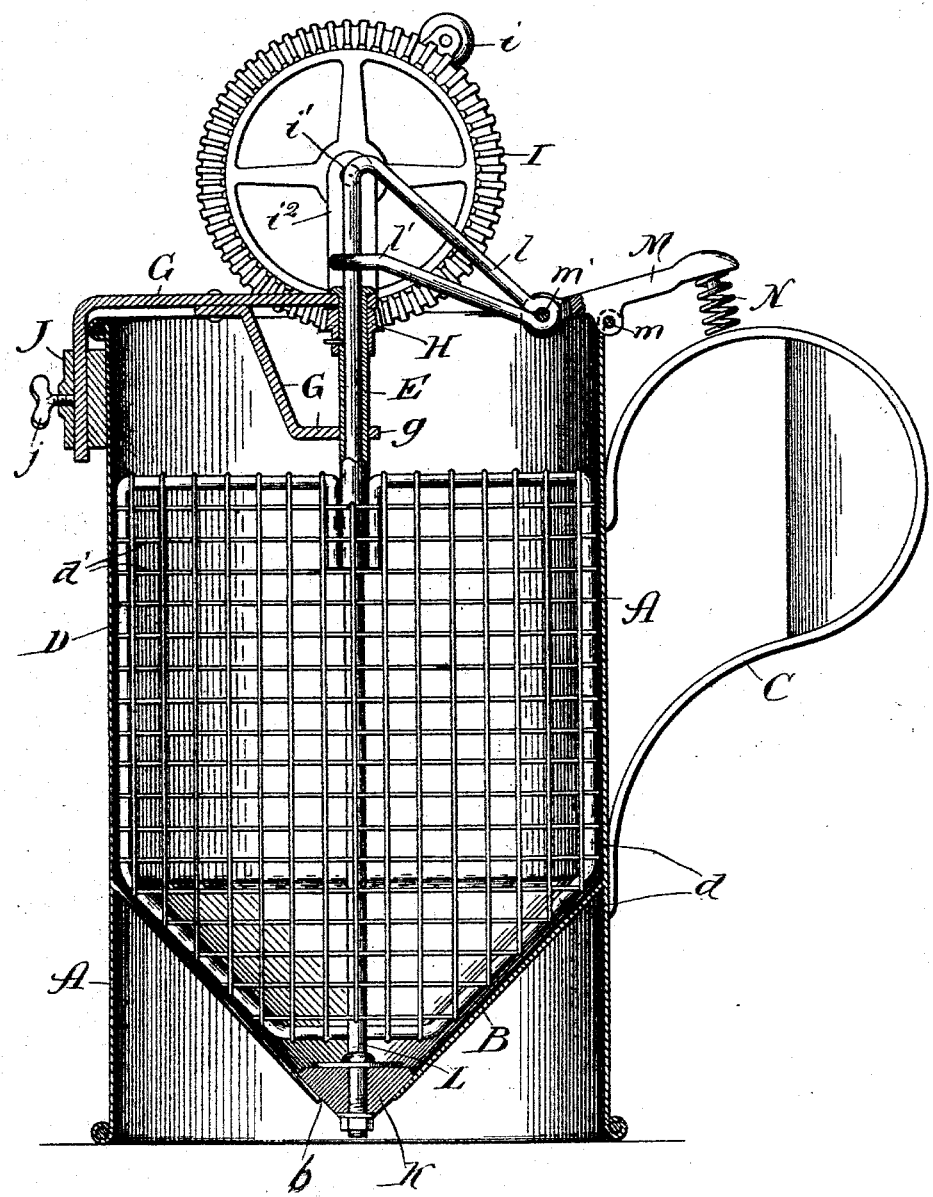

ALEXANDER BURGESS, OF CHICAGO, ILLINOIS, ASSIGNOR TO THE AMERICAN CEREAL COMPANY, OF AKRON, OHIO.

BEATER AND DROPPER.

SPECIFICATION forming part of Letters Patent No. 515,571, dated February 27, 1894.

Application filed December 2, 1893. Serial No. 492,576. (No model.)

*To all whom it may concern:*

Be it known that I, ALEXANDER BURGESS, a citizen of the United States, residing at Chicago, Illinois, have invented certain new and useful Improvements in Beaters and Droppers, of which the following is a specification.

The object of my invention is to provide a simple, economical and efficient beater and dropper to be used in connection with beating, stirring and mixing buckwheat flour, or other materials used in cooking; and my invention consists in the features and combinations hereinafter described and claimed.

In the drawing I have shown a vertical sectional elevation of my preferred form of beater and dropper.

In constructing my improved beater and dropper I make a receptacle, A, preferably cylindrical in shape and of the proper size to hold any desired quantity of material to be mixed, and preferably provide this receptacle with a funnel-shaped bottom, B, having an opening or orifice for the discharge of the material at its lower apex, $b$. This funnel-shaped bottom may be either integral with the receptacle or formed separate therefrom and afterward attached thereto; and if desired it may have only two of its sides inclined in toward the discharge opening. It will be understood then that I do not use the term funnel-shaped in any technical sense, but simply as meaning deflecting sides to assist in discharging the material.

The receptacle may be provided with a handle, C, with which the operator can hold the same while beating the material or while moving it from place to place.

To stir or beat the material I provide a beater, D, which is formed of any desired reticulated material, or blades, but I prefer to form it of a frame of wire, $d$, having pieces of a lighter wire, $d'$, attached thereto and running at right angles to each other to form a mesh of about three-eighths of an inch square. I attach this beater to a vertical hollow sleeve, E, at its upper portion, which is journaled in a bracket, G, at $g\ g$, and rigidly secure to this sleeve a small beveled pinion, H, which is arranged to be engaged with and driven or rotated by means of a bevel gear wheel, I, provided with a handle, $i$, so that as the bevel gear wheel is rotated the rotation is imparted through the beveled pinion and sleeve to the beater. The bracket G may be secured to the receptacle in any desired manner, but I prefer to secure it in a slotted block, J, by means of a thumb-screw, $j$. The bevel wheel I is journaled at, $i'$, to the upwardly extending arm, $i^2$, preferably secured to the outer end of the bracket G.

To normally close the discharge opening at the apex of the funnel-shaped bottom I provide preferably a conically shaped cushion stopper or valve, K, which is secured preferably to a vertical valve rod, L, which passes preferably up through the center of the receptacle through the hollow sleeve E. This valve rod may be bent at its upper end to form an angular arm at, $l$, bending it back again to connect with itself at $l'$, to give the necessary rigidity for the purpose of raising or lowering the valve at its lower end; or it may be formed in any other way capable of serving the same purpose.

To raise and lower the valve I provide a lever, M, preferably pivoted to the receptacle at, $m$, and pivotally connected at its inner free end with the outwardly extending arm on the valve rod, at, $m'$. I interpose between the opposite free end of the lever and the handle on the receptacle a short stiff spiral spring, N, which acts to push the outer end of the lever upward, depressing its inner end to normally close the valve in the beater to prevent any material which may be contained in such beater from being discharged through the discharge opening. To open the valve in the funnel-shaped bottom I depress the outer end of the lever M, which thereby raises the inner vibrating end, engaged with the outwardly extending arm of the valve rod. This raises the valve rod and with it the valve at its lower end, thereby permitting whatever material that may be in such receptacle to be discharged.

In operation the material to be beaten or mixed is placed in the receptacle and the beater rotated by means of its operating mechanism until such material has been thoroughly beaten, mixed or commingled, when by depressing the small lever adjacent to the handle of the receptacle the valve at the lower apex of the funnel-shaped bottom is open and the material permitted to be discharged.

Some of the advantages of my invention are that it provides for a combined beater and dropper in one construction; that the material can be easily beaten or mixed and discharged without returning it through the mixing or operating mechanism, the funnel-shaped bottom being so constructed that all of the material actually passes out below; that discharge of the material may be regulated in quantities as desired; and that the beating and operating mechanism may be readily removed whenever it is desired to clean the receptacle.

While I have described more or less minutely the details of my invention in its precise forms, it will be understood that I do not intend to be limited thereto, on the contrary I contemplate, changes in form, construction and arrangement, the omission of parts and the use of equivalents as circumstances may suggest or render expedient.

I claim—

1. In a combined beater and dropper, the combination of a receptacle having a mixing chamber provided with a discharge opening, mechanism arranged to close such opening and adapted to be operated to permit the discharge of any material contained therein, and beating mechanism rotatably mounted in such mixing chamber, substantially as described.

2. In a combined beater and dropper, the combination of a receptacle having a mixing chamber provided with a discharge opening, a valve arranged to close such discharge opening, mechanism arranged to operate such valve and permit the discharge of any material contained in the receptacle, and beating mechanism arranged in such mixing chamber, substantially as described.

3. In a combined beater and dropper, the combination of a receptacle having a mixing chamber, a funnel-shaped bottom for such mixing chamber having a discharge opening, mechanism arranged to close the discharge opening and adapted to be operated to permit the discharge of any material contained therein, and beating mechanism arranged in such mixing chamber, substantially as described.

4. In a combined beater and dropper, the combination of a receptacle having a mixing chamber provided with a discharge opening, a valve arranged to close such opening and adapted to be operated to permit the discharge of any material contained therein, a beater mounted rotatably in such chamber, and means for rotating such beater, substantially as described.

5. In a combined beater and dropper, the combination of a receptacle having a mixing chamber provided with a discharge opening, a valve arranged to close such opening, means for operating such valve to permit the discharge of any material contained in the mixing chamber, beating mechanism mounted rotatably in such chamber, and mechanism for rotating such beater, substantially as described.

6. In a combined beater and dropper, the combination of a receptacle having a mixing chamber, a funnel-shaped piece forming the bottom for such chamber provided with a discharge orifice at its apex, a valve arranged to close such opening and adapted to be operated to permit the discharge of any material contained in such mixing chamber, and a beater mounted rotatably in such mixing chamber, substantially as described.

7. In a combined beater and dropper, the combination of a receptacle having a mixing chamber, a funnel-shaped piece attached thereto and forming the bottom for such mixing chamber provided with a discharge opening at its apex, a valve arranged to close such opening, mechanism for actuating such valve to close or open the discharge opening, beating mechanism rotatably mounted in such mixing chamber and mechanism for rotating such beating mechanism, substantially as described.

8. In a combined beater and dropper, the combination of a receptacle having a mixing chamber, a funnel-shaped piece attached thereto forming the bottom of such mixing chamber and provided with a discharge opening at its apex, a valve arranged to normally close such opening, mechanism for raising such valve, a beater rotatably mounted in such mixing chamber, and mechanism for rotating the beater, substantially as described.

ALEXANDER BURGESS.

Witnesses:
EDWARD B. MOWER,
THOMAS F. SHERIDEN.